Dec. 3, 1963  G. BARONE  3,112,626
FLEXIBLE JOINT FOR TORQUE TRANSMISSION
Filed June 19, 1962  4 Sheets-Sheet 2

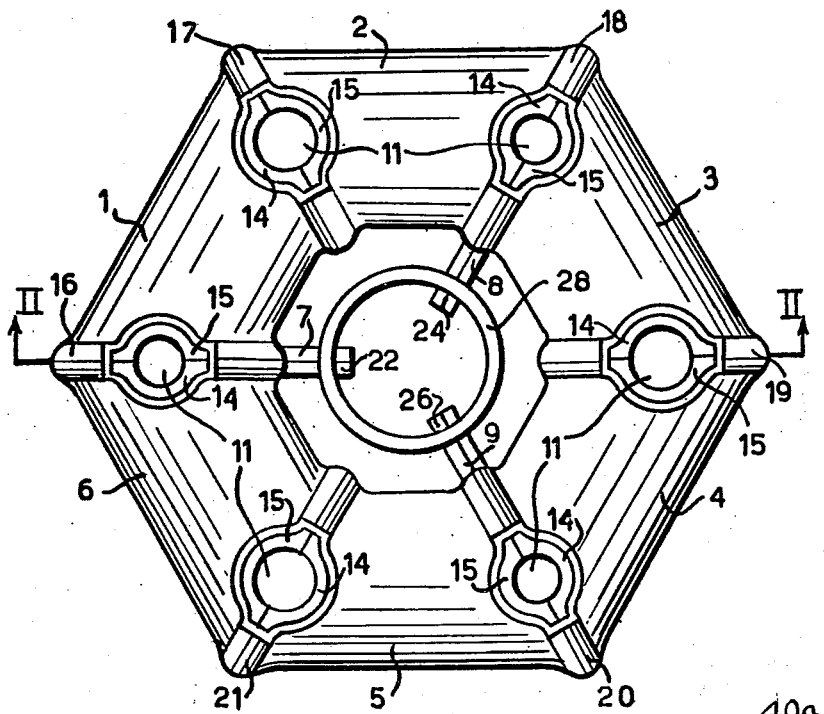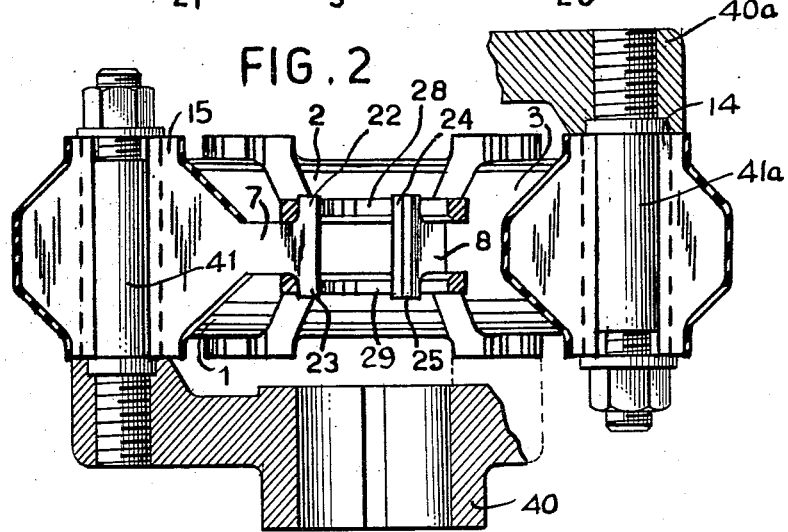

Dec. 3, 1963    G. BARONE    3,112,626
FLEXIBLE JOINT FOR TORQUE TRANSMISSION
Filed June 19, 1962    4 Sheets-Sheet 3

Dec. 3, 1963     G. BARONE     3,112,626
FLEXIBLE JOINT FOR TORQUE TRANSMISSION

Filed June 19, 1962     4 Sheets-Sheet 4

United States Patent Office 3,112,626
Patented Dec. 3, 1963

3,112,626
FLEXIBLE JOINT FOR TORQUE TRANSMISSION
Gennaro Barone, Milan, Italy, assignor to Società Applicazioni Gomma Antivibranti "S.A.G.A." S.p.A., Milan, Italy
Filed June 19, 1962, Ser. No. 203,490
Claims priority, application Italy Dec. 2, 1961
5 Claims. (Cl. 64—11)

This invention relates to flexible joints for transmitting torque, of the type in which the resilient ring interconnecting the two spiders comprises an annular series of rectilinear rubber studs arranged with their axes along the sides of a flat polygon, and two sets of rigid radial members interconnecting each pair of adjacent studs, each of said members being formed with an attachment bore extending parallel with the general axis of the ring adapted to receive a pivot or bolt carried by the arm of the spider relative to the set.

It is known that in joints of this type, for the sake of the flexibility of the resilient ring, as long rubber studs as possible are advantageously employed, wherein the average length is at least equal to the radial thickness of the studs.

It is further known that, in order to afford satisfactory operating conditions for the stud rubber, the studs are pre-compressed in the direction of their length.

In order to set up and maintain the pre-compressed condition for assembly of the flexible ring on the spiders, the ring is surrounded by a clamp comprising a steel strip and a tightening member, quite similar to clamps employed for attaching hoses on their fittings. The resilient rings are thereby ready for fitting on the spiders carried by two distinct shafts to be coupled, which are usually subjected to a dynamic balancing before assembly of the joint on the spiders.

It is inconceivable to assemble a joint of the abovementioned type on the spider of either shaft in order to effect balancing of the shaft and, additionally of the joint, as would be desirable, in as much as it is not possible to maintain the joint under the conditions of actual operation in practical use.

In order to obviate this drawback this invention provides a flexible joint for transmitting torque of the abovementioned type, characterized by the fact that the ring is equipped with means radially retaining at least one of the two sets of the rigid radial members in a mutual pre-stressed condition of the studs suitable for assembly on the respective spider.

Figure 3:
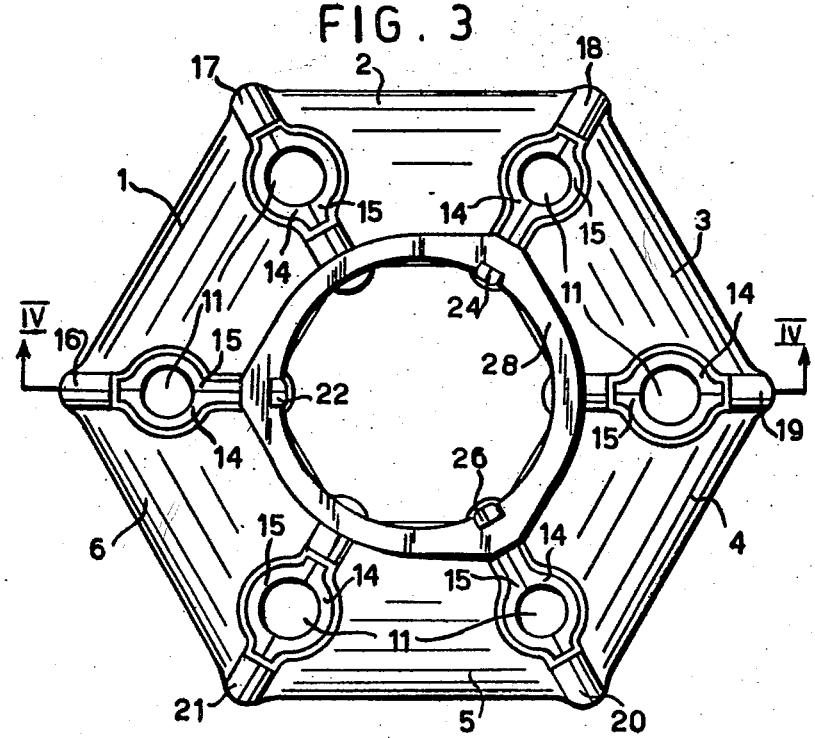
Figure 4:
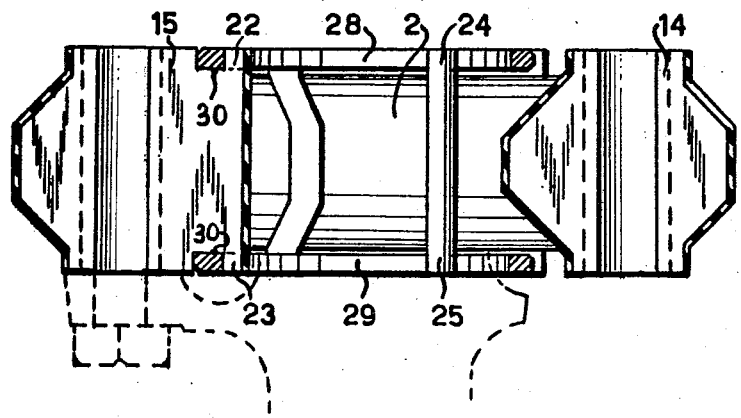
Figure 5:
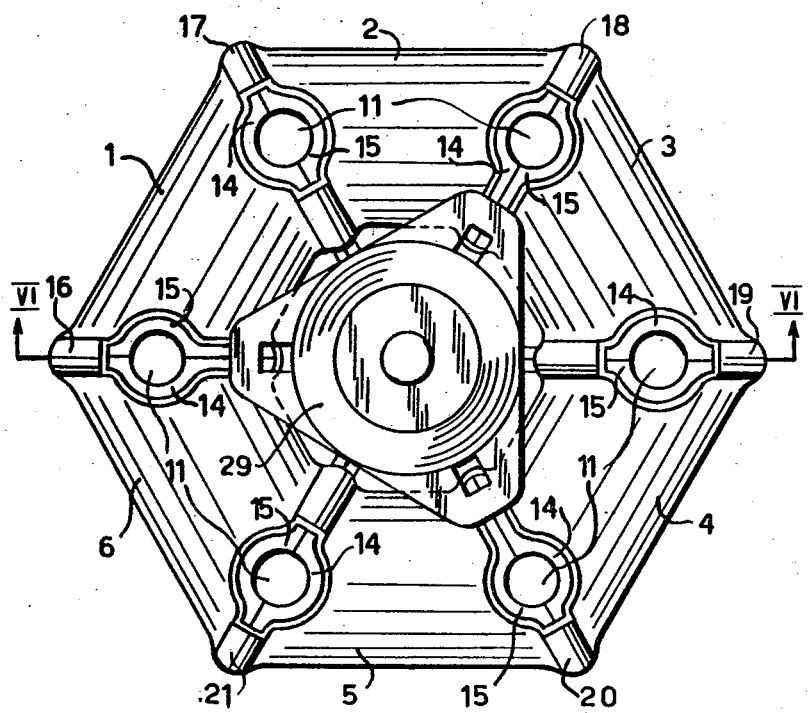
Figure 6:
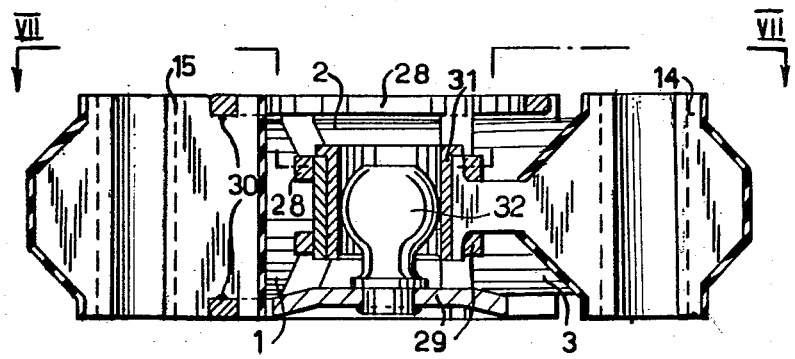
Figure 7:
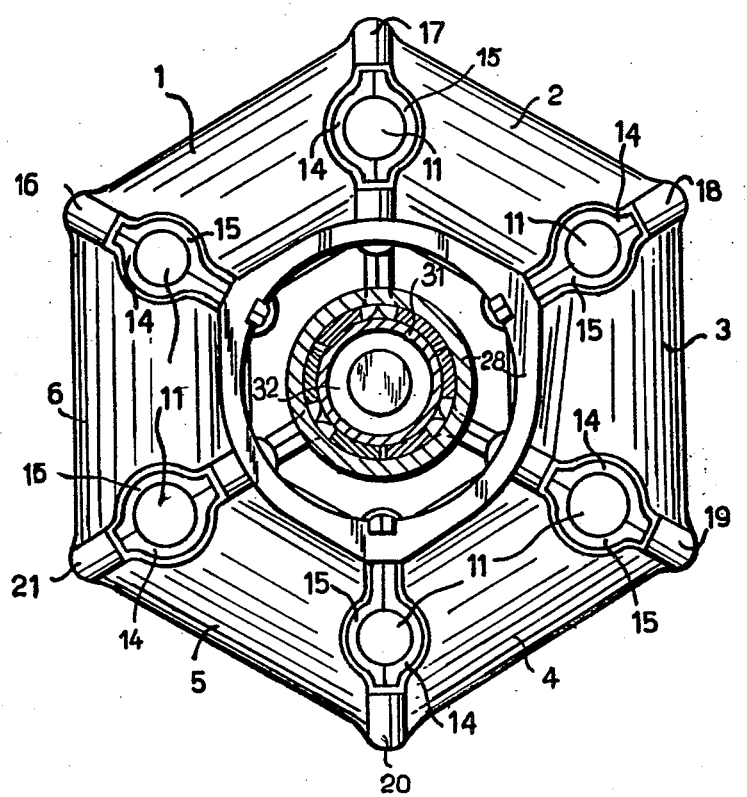

Further characteristic features and advantages of this invention will be understood from the appended detailed description referring to the accompanying drawings given by way of a non limiting example, wherein:

FIGURE 1 is an axial view of a hexagonal resilient ring according to this invention, FIGURE 2 is a sectional view on line II—II of FIGURE 1, FIGURE 3 is an axial view of a hexagonal ring according to a further embodiment of this invention, FIGURE 4 is a sectional view on line IV—IV of FIGURE 3, FIGURE 5 is an axial view of a hexagonal ring according to a still further embodiment of this invention, FIGURE 6 is a sectional view on line VI—VI of FIGURE 5, FIGURE 7 is a sectional view on line VII—VII of FIGURE 6.

Six rectilinear rubber studs of a circular cross sectional shape are denoted by 1, 2, 3, 4, 5 and 6. The studs are arranged with their axes along the sides of a regular hexagon.

Rigid radial attachment members 16, 17, 18, 19, 20 and 21 are interposed between and vulcanized to the pairs of adjacent studs, each being formed with a substantially cylindrical bore 11 having its axis extending parallel with the axis of the ring.

Apart the region of the said bore 11 the rigid radial attachment members are substantially flat and are located in planes extending through the axis of the ring.

The end surfaces of the individual studs therefore substantially converge to the ring axis, so that the length of the external generatrix of each stud is greater than the length of its internal generatrix.

The average length of each stud, resulting from the half-sum of the lengths of the external and internal generatrices is, according to an advantageous feature of this invention, greater than the radial thickness (diameter) of the stud.

The bores 11 in the attachment members 16, 17, 18, 19, 20 and 21 are situated on a common circumference, concentrical with the ring axis.

The attachment members consist each of two superposed metal plates 14, 15, the middle zones of which are arcuate to form two shell halves which define together the attachment bore 11.

The remaining portions of the plates 14, 15 are flat and welded together, such as by spot welding, whereby the plates form a unit in the shape of a cylindrical metal bushing having two diametrically opposite flat tabs.

Referring to FIGURES 1 and 2, every other attachment members 16, 18, 20, forming a set of members to be coupled to one and same spider 40 by means of bolts 41, are formed with T-shaped extensions 7, 8 and 9 directed towards the axis of the ring, each having a pair of axially directed projections 22 . . . 27, symmetrical with respect to the mid-plane of the ring perpendicular to the coupling axis.

A metal plate 28 of ring shape engages by its inner edge the projections 22, 24 and 26 which are situated on the same side with respect to the said mid-plane of the ring, and a further metal plate 29, similar to plate 28, engages the other three projections 23, 25 and 27 in a radial constraint.

The other attachment members 17, 19 and 21, which are deprived of extensions, are maintained in a pre-stressed condition suitable for assembly on the spiders by a clamps (not shown) identical to that disclosed by Franceschetti et al. Patent No. 2,982,118 of May 2, 1961.

By this arrangement dynamic balancing of a shaft can be effected in the assembled condition of the ring on the spider on the shaft. To this end the ring is assembled on the spider bolts 41a of the shaft by its attachment members 17, 19 and 21, which are deprived of extensions, whereupon the clamp is removed from the joint; movements of the attachment members 17, 19, 21 are prevented in this condition by the bolts 41a on the spider 40a fitted into their respective bores 11 and associated nuts.

The position of the remaining three attachment members 16, 18 and 20 remains unaltered, the rings 28, 29 preventing any centrifugal displacement thereof.

Ultimately the pre-stressed condition of the rubber studs is maintained during balancing and for assembly on the spider on the other shaft.

According to FIGURES 3 and 4 the attachment members 16, 18 and 20 are formed in their axially opposite edges with pairs of notches 30 which result in pairs of projections 22, 23, 24, 25, 26 and 27 symmetrical with respect to the mid-plane of the ring perpendicular to the axis of the latter.

The difference in arrangements of the projections 22, 23, 24, 25, 26 and 27 in the former and latter embodiments of the invention leads to the same result, which consists in providing the ring with means which radially retain at least one of the two sets of rigid radial members to be coupled to one and same spider in a mutual pre-stressed condition of the studs suitable for assembly on said spider, the position of the metal plates 28 and 29 accomplishing this retaining function being varied, in as much as accordng to the former embodiment the plates are spaced from the mid-plane of the ring by an extent appreciably smaller than the half thickness of the ring, preferably of the order of one fourth of said thickness while, according to the latter embodiment, the plates are spaced from the mid-plane by an extent approximately equalling the half thickness of the ring.

FIGURES 5, 6 and 7 show a third embodiment, in which both sets of attachment members to be distinctly coupled to the two spiders are retained in mutual pre-stressed condition of the studs suitable for assembly of the sets on the respective spiders, matching the actual operational configuration.

In order to avoid interference of the metal plates a first set of members is retained in accordance with the embodiment shown in FIGURES 1 and 2, the second set of members being retained according to the embodiment shown in FIGURES 3 and 4, whereby the plates are mutually staggered in axial direction of the ring.

According to the third embodiment, a sleeve 31 smaller in length than the thickness of the ring is coaxially secured to the ends of the T-shaped extensions, while a pin having a spherical head 32 is centrally secured to one (29) of the plates 28, 29 engaging the notches 30 and is directed towards the centre of the ring.

The diameter of the spherical head 32 equals the bore of the sleeve 31 which accommodates the head for centering the joint.

What I claim is:

1. A resilient joint of the type comprising an annular series of rectilinear rubber studs in prestressed condition arranged with their axes along the sides of a flat polygon and two sets of rigid radial members interconnecting pairs of adjacent studs, each of said members being formed with an attachment bore extending parallel to the axis of the joint to engage a bolt carried by its respective arm on the associated spider, characterized by means radially retaining at least one of the two sets of the members in said pre-stressed condition of the studs suitable for assembly on said spider of the retained set, said means comprising a pair of metal plates, and a pair of axially directed projections on each of the members in the retained set, the projections being directed outwardly and symmetrical in respect of a mid-plane of the joint and the projections situated on the same side with respect to said mid-plane engaging in their respective plate and being radially retained by the latter against radially outward displacement.

2. Joint as claimed in claim 1, characterized by the fact that the metal plates are spaced from said mid-plane by an extent approximately equalling the half thickness of the joint.

3. Joint as claimed in claim 1, characterized by the fact that the metal plates are spaced from said mid-plane by an extent which is of the order of one fourth of the joint thickness.

4. Coupling as claimed in claim 1, characterized by the fact that both sets of rigid members to be coupled to their respective spiders are retained by respective pairs of metal plates, the plates of a first pair being spaced from the mid-plane by an extent approximately equalling half thickness of the joint, and the plates of the other pair are spaced from said plane by an extent of the order of one fourth of the joint thickness.

5. Joint as claimed in claim 4, characterized by the fact that a pin having a spherical head is centrally secured to one of the plates remote from the mid-plane and is axially directed towards the centre of the joint, and a sleeve smaller in length than the joint thickness is axially secured to the projections retained by the innermost plates, the diameter of the spherical head equalling the bore in the sleeve by which it is accommodated for centering.

References Cited in the file of this patent

UNITED STATES PATENTS

| 2,515,000 | Guy | July 11, 1950 |
| 2,515,002 | Guy | July 11, 1950 |
| 2,982,118 | Franceschetti et al. | May 2, 1961 |

OTHER REFERENCES

German Printed Application 1,095,595, printed Dec. 22, 1960 (Phoenic Gummiwerke).